July 14, 1931. H. WICKLAND 1,814,993
RETAINER FOR THE BALLS OF BALL BEARINGS
Filed April 11, 1928
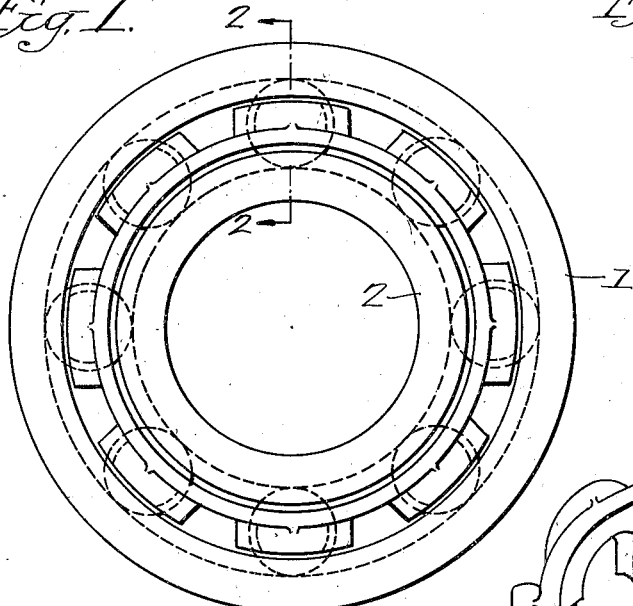
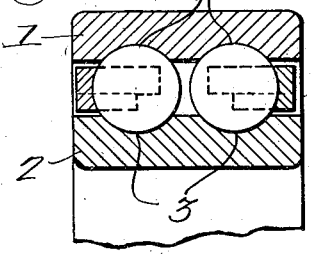
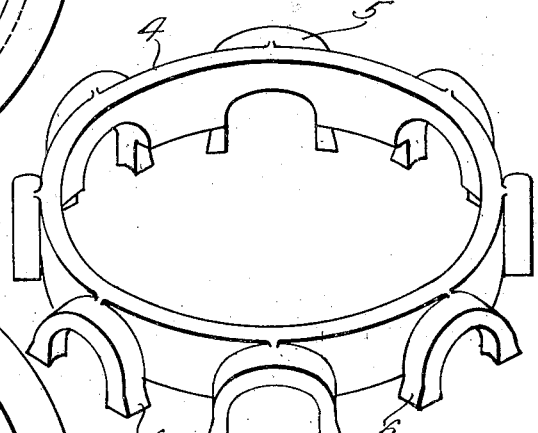
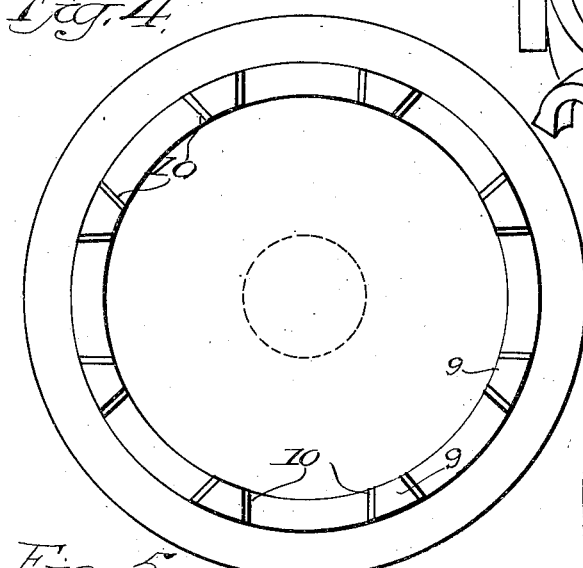
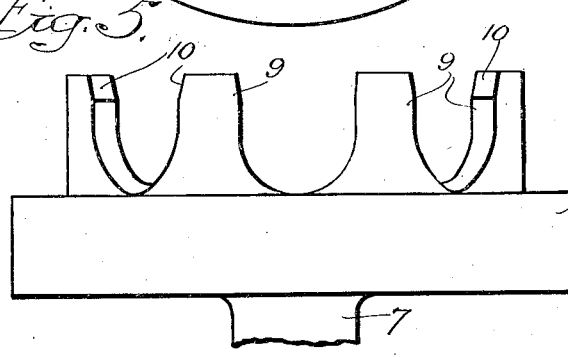
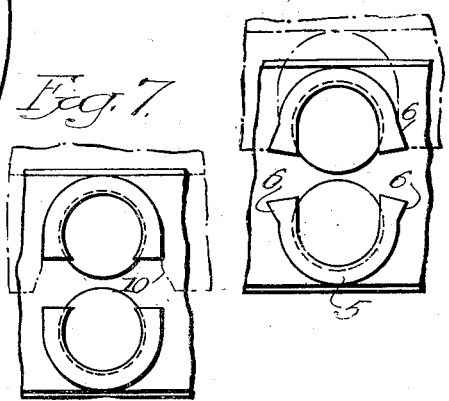
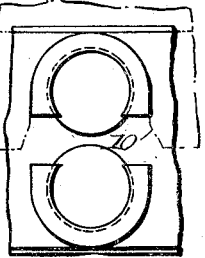

Patented July 14, 1931

1,814,993

UNITED STATES PATENT OFFICE

HARRY WICKLAND, OF PHILADELPHIA, PENNSYLVANIA

RETAINER FOR THE BALLS OF BALL BEARINGS

Application filed April 11, 1928. Serial No. 269,205.

This invention relates to ball bearings, and more particularly to improvements in the cages forming a part of such bearings the function of which is to retain the balls in predetermined spaced relation in the races.

It is practice in ball bearings of the double row type to employ separate cages for each row, these cages by reason of the restricted space between the rows of bearings being so arranged as to render access to the inner ends of the ball-embracing elements, which, in assembling, must be distorted in order to retain the balls.

It is the principal object of the present invention to provide a novel form of cage or retainer lending itself readily to use in double row bearings, and with this in view, the invention resides primarily in the provision of novel means for closing the ends of the ball-embracing elements in assembly to retain the cages in position and the balls in the predetermined spaced relation.

In the attached drawings:

Figure 1 is a side view of an assembled bearing made in accordance with my invention;

Fig. 2 is a section on the line 2—2, Fig. 1;

Fig. 3 is a view in perspective of a preferred form of cage or retainer;

Figs. 4 and 5 are, respectively, face and side views of an instrument for closing the ball-embracing elements, and Figs. 6 and 7 are, respectively, fragmentary views illustrating the manipulations by which the parts are assembled.

With reference to the drawings, the bearing may comprise the usual casing comprising outer and inner annular elements 1 and 2 having in their inner and outer surfaces respectively grooves 3 which in assembly register in pairs to form the races for the balls. In the present instance, the casing elements are provided in each instance with a pair of these grooves for the formation of two races in which the closely adjacent rows of balls operate.

This type of bearing, which will be readily understood by those familiar with the art, further comprises a pair of ball retainers or cages which in general form may be similar to that shown in Fig. 3. These retainers comprise generally an annular element or base ring 4 carrying a plurality of elements 5 which prior to assembly are substantially U-shaped to form ball-receiving pockets and which include projecting ends or prongs adapted to be bent toward each other to embrace the balls and to confine them in the pockets, whereby the retainers are held in position and function to maintain the balls in proper spaced relation. As stated above, the restricted space between the rows of ball bearings of the type illustrated, as well as other difficulties in assembling, renders it necessary to apply these retainers, as illustrated, with the backs of the pockets outwardly, and difficulty is frequently experienced in closing the pockets satisfactorily so as to confine the balls while leaving them free to rotate with respect to the pocket elements.

Referring particularly to Figs. 3 and 6 of the drawings, it will be noted that the outer faces of the pocket elements 5 at the extremities are angularly and outwardly offset, as indicated at 6, the pocket elements thereby being wider at the extremities than in the other parts. With this construction, I provide a suitable tool, a preferred form of which is shown in Figs. 4 and 5, which co-operates with the aforedescribed pocket formation to provide means whereby the extremities of these elements may readily be bent inwardly to embrace the balls.

This tool in the form shown in Figs. 4 and 5 comprises a shank 7 having at one end a transversely extending head 8 of circular form, from the outer face of which projects in a circular row a series of teeth 9. These teeth whose side edges are parallel and vertical with respect to the outer surface of the head 8, are spaced apart to an extent conforming with the outside diametral dimensions of the pocket elements 5, and the outer ends of the teeth 9 are beveled or tapered, as indicated at 10 in accordance with the angularity of the offset part 6 of the pocket elements. When the tool is applied as illustrated in Fig. 6 so that the ball-embracing elements enter the spaces between the teeth, the beveled portions 10 of the teeth and the surfaces 6 of the elements meet, and when the tool is forced downwardly to the position shown in Fig. 7, the extremities of the pocket elements 5 are forced inwardly to embrace the balls. This tool, therefore, constitutes in effect a die, which when forced downwardly upon the cages after the latter have been inserted between the casings 1 and 2, turns the prongs of the pocket elements inwardly around the balls as desired.

Obviously, the device materially facilitates the assembly operation and insures a closing of the pocket elements with absolute uniformity and in a predetermined manner to closely embrace the balls while providing ample freedom for the latter to turn in their normal function. As stated, the device is particularly applicable to bearings of the double row type in which access to the pocket elements for closing of the prongs around the balls is relatively difficult by reason of limited space, the pocket-closing teeth being relatively small and the manipulation of the tool as a whole being extremely simple.

I claim:

A cage for ball bearings comprising a plurality of relatively fixed substantially U-shaped ball-receiving pocket elements the extremities of the arms of which are of greater thickness than the other parts of said arms and have their excess thickness at the outer faces thereof whereby the outer faces of said extremities flare outwardly to project transversely beyond the normal outer side faces of the arms.

HARRY WICKLAND.